2,976,164
LIGNOCELLULOSE PRODUCT AND METHOD

William T. Glab, Dubuque, Iowa, assignor, by mesne assignments, to Durel Incorporated, Dubuque, Iowa, a corporation of Iowa No Drawing. Filed Sept. 25, 1958, Ser. No. 763,193

17 Claims. (Cl. 106—163)

This invention relates to a method of making a lignocellulose reaction product composition and to the resulting composition.

One of the features of this invention is an improved method of making a moldable lignocellulose reaction product in which the lignocellulose is reacted with a chloride catalyst in the presence of moisture while the reacting mass is confined under superatmospheric pressure in an autoclave to produce a product that may be molded under heat and pressure or that may be extruded to form shaped products.

Another feature of the invention is to provide such an improved method wherein the reacting mass may contain in addition to the chloride catalyst other reactants and modifying agents including lignin, Vinsol, phenols, organic acids, sulfur, unsaturated organic compounds, alcohols, or the like or any other desired modifying agent so that the characteristics of the resulting moldable product may be varied as desired.

A further feature of the invention is to provide improved moldable products prepared according to the method of this invention.

In this invention, finely divided lignocellulose is reacted in the presence of moisture with a chloride catalyst at an elevated temperature and under superatmospheric confined pressure to produce the moldable and extrudable composition. The chlorides which operate as the catalyst may be either inorganic or organic and appear to operate as destructive catalysts in that they are themselves broken down during the reaction. However, they appear to be self-generating, as the improved moldable compositions are prepared even when only a small amount of the catalyst of the order of 0.1% by weight of the lignocellulose or less is used. Thus observations and tests have indicated that the chloride operates as a true self-generating catalyst and therefore any of a very large number of catalysts are indicated as being useful to produce the results of this invention. For example, alkali metal chlorides, ammonium chloride, alkaline earth metal chlorides, transition metal chlorides, chlorides of the third and fifth sections of the periodic table, as well as organic chlorides are usable.

All of the chlorides that have been tried have been found to produce this catalytic effect. These are potassium chloride, ammonium chloride, magnesium chloride, calcium chloride, manganese chloride, zinc chloride, copper chloride, iron chloride, aluminum chloride, titanium chloride, and acetyl chloride. Because the chlorides act as a catalyst to promote the reaction in the high pressure reaction vessel, the choice of the chloride is vast.

An important advantage of the invention appears to be the control obtained over different reactions, by choosing the proper chloride, to obtain a wide variety of products. The general activity of these catalysts appears to be of the following decreasing order: titanium>aluminum>cupric>ferric>acetyl>ammonium>ferrous > zinc>manganese>magnesium>calcium>potassium.

In actual practice it has been found that in most instances the amount of chloride catalyst used will vary between 0.1–50%, with the preferred amount being 0.1–20%. The pressure that has been most generally used is one between about 25–700 pounds per square inch gauge, with a range of about 50–500 pounds per square inch being especially preferred. The temperature of the reaction is generally between about 250–500° F., with the range of about 275–475° F. being especially preferred. The time of reaction will, of course, vary depending upon the particular chloride or mixture of chlorides used as a catalyst, but in most instances has been found to be between about 4–60 minutes.

The reaction product prepared with these catalysts can be modified by including in the reacting mass modifying agents or mixtures thereof. Modifying agents that have been found particularly useful include lignin, preferably in an amount between about 2–30%; Vinsol, preferably in an amount of about 2–30%; a phenol such as either phenol or cresol, preferably in an amount of about 1–20%; liquid fatty acids such as butyric acid, or Tall oil, preferably in an amount of about 0.5–50%; sulfur, preferably in an amount of about 0.5–20%; unsaturated organic compounds such as dicyclopentadiene or styrene, preferably in an amount of about 0.5–30%; alcohols, such as isopropyl alcohol or glycerine, preferably in an amount of about 2–30%.

The catalyst of this invention converts the raw lignocellulose to a resinous material which is compatible with synthetic resin systems to produce shaped products of desired characteristics. The resinous material formed with the catalyst of this invention can be used as water repellent binders for either organic or inorganic fillers in molding compositions. Observations have indicated that the presence of the catalysts in the high temperature and superatmospheric pressure conditions in the presence of moisture causes an increased reaction rate of hydrolysis, esterification, alkylation, or polymerization of the lignocellulose itself. Furthermore, it appears that the presence of the chloride catalyst actually lowers the time, temperature and pressure requirements for bringing about such reactions in a superatmospheric pressure system and also increases the yield of the moldable product. It appears that the catalyst catalyzes the breaking off of at least a portion of the lignin from the lignocellulose and causes a reforming of the hemicellulose fraction. Thus it appears, although the invention is not limited to this or any other theories expressed herein, that the catalyst causes a breaking of the lignocellulose bond to provide lignin and that the alphacellulose is depolymerized to make the product resistant to moisture and also that a portion of the hemicelluloses are converted to high molecular weight resins that may be molded, extruded, or otherwise used, similar to the ordinary molding resins. The reactions which appear to take place in the high pressure reacting mass also appear to include esterification, or alkylation, or alcoholic groups present to modify further the properties of the lignocellulose.

The lignocellulose that is used is essentially dry to the touch. Such lignocellulose may contain up to about 30% by weight of water and still feel dry.

In the method of this invention an essentially dry mixture including comminuted lignocellulose and a chloride capable of catalyzing both the breakdown of at least a portion of the lignocellulose to provide lignin or modified lignin, and of reforming a part of the hemicellulose is reacted, as by heating, while confining the lignocellulose, and the catalyst under superatmospheric pressure, as in an autoclave. During the reaction, the lignocellulose bond is apparently broken and the lignin is released to operate as a binder. It appears that the lignin is also modified, possibly by a reduction of the cross-linking between the lignin molecules; since the product is formable in the 250–300° F. temperature range, indicating a reduction in the melting point of the lignin, and hence in molecular size.

Depending upon the conditions and reactants utilized, one or several reactions can be carried out simultaneously. For example, if steam, in the presence of a chloride, is used as a reactant, as well as, a heat transfer medium, the controlling reaction will be hydrolysis. Under these conditions, it appears that the hemicellulose is the primary constituent of the lignocellulose which is attacked, but that under the high pressure and temperature of this invention, a portion of the hydrolysate is further converted to higher molecular weight materials which can function as plasticizers for the autoclave product when it is molded, or otherwise formed.

At the same time, the hemicelluloses are being reformed, a controlled depolymerization of the alpha-cellulose is apparently carried out to the extent that the desired degree of moisture stability is obtained in the molded or formed products, without an unnecessary loss of toughness. The chloride functions as a catalyst for both this depolymerization, as well as, the repolymerization of the hemicellulose hydrolysate. These actions are believed to occur although they have not been absolutely proven.

The chlorides have also been found useful in promoting specific lignocellulose reactions which result in autoclaved products with improved moisture resistance, thermoplastic flow and bonding tendencies. Typical of these reactions are esterfication using acids such as Tall oil and butyric. Alkylations of the lignocellulose with both alcohols and olefins are promoted by the chlorides, and can be used to introduce different alkyl groups, and thus further vary the properties of the product. These reactions can be carried out simultaneously in the presence of steam, along with the partial hydrolysis, and polymerization of hydrolysate fractions, to produce materials having a wide range of properties.

The high pressure method of this invention has a number of advantages that are not possible with reactions taking place at ordinary pressures and in an unconfined state. In the preferred process, steam is introduced into the autoclave both for heating purposes, and to supply moisture for the reaction. With high pressures, heat transfer is much more rapid; so that in general a shorter reaction time is required.

Furthermore, in a closed system energy losses during the reaction are greatly reduced. In the ordinary reacting mixture these energy losses result from the release of volatile materials such as water vapor, gaseous reaction by-products and the like. As the reaction here takes place in a confined atmosphere, no such losses occur to any material degree.

Another important advantage of this process is the close control that is obtained over the reaction. Thus the temperature of the reacting mass, and hence the rate of reaction can be easily raised or lowered by controlling the rate of flow, pressure and temperature of the heat transfer medium which may be steam, oil vapor or other high temperature fluids. Reactions can easily be stopped by flashing the heat transfer medium from the autoclave; since the large energy loss on expansion cools the reacting mass below the incipient reaction point. During the practice of the process, the reacting mixture may be confined in a jacketed vessel with the heating medium introduced to the chambers in the quantity and at the temperature desired.

Tests have shown that the confining of the reacting mass in the autoclave not only causes retention of the by-products of reaction within the mass, even when the by-products are gaseous, but also causes polymerization of all or a portion of these by-products.

Another advantage of the invention is that the volatile by-products do not go into solution as in wet processes, but are easily collected and removed at low cost for later use, where desired, or to prevent the creation of a nuisance.

A very important advantage of the invention is that volatile reactants may be used, as the reacting mass is in a confined space. Volatile reactants are impractical, of course, when the reacting mass is in the open. As a result of the rapid heat transfer achieved by this invention, and the penetration of volatile reactants, the reaction not only proceeds to completion in a much shorter time, but the final product tends to be more uniform than where the reactants are heated, such as in an ordinary process that depends upon surface temperature differentials.

Where the reactants are volatile, no mechanical mixing of the ingredients is required. This results in a considerable saving in time, labor and other factors. Thus, in these instances, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing a vapor process is that the volatile content of the reaction product, which is primarily moisture, can be controlled. By using superheated steam with a sufficient degree of superheat, products on the order of 1% volatile content can be obtained. Under normal conditions 25 degrees of superheat at 300 pounds per square inch steam pressure will produce a product of 5–8% volatile content. Thus the expensive drying step connected with wet processes can be avoided.

Because of rapid penetration of reactants under high pressure, larger sized particles of lignocellulose can be charged to the autoclave than would ordinarily be used, and a savings in size reduction cost made, as a result of lower power requirements to reduce the treated material in comparison with raw lignocellulose.

The methods of this invention may be carried out batchwise in an autoclave or a sealed press, or continuously in a continuous contactor.

The lignocellulose which may be used in this invention includes wood as well as other lignocellulosic vegetable materials. The lignocellulose is finely divided; so that the particles are preferably not more than ¼ mesh in average size as measured by a standard screen.

Where the reactant is steam, this steam is preferably supplied to the autoclave or other confined reactor at a temperature of 250–500° F., and the reaction is permitted to proceed for from 4–60 minutes. In general, the longer periods of time are used with the lower temperatures, while shorter periods are required with higher temperatures.

The steam may be saturated or superheated, and may be at a pressure of between 25–700 pounds per square inch gauge. In the preferred process the temperature of the steam is between 275°–475° F., and between 50–550 pounds per square inch gauge. The choice of steam pressure, and temperature, for any particular reaction will depend upon the chloride used as a catalyst. In general, the higher temperatures and pressures are used with the catalysts having the least activity as previously listed, and the lower temperatures and pressures are used for the most active. Thus with potassium chloride the lowest pressure generally used is 300 pounds per square inch gauge, while with aluminum chloride 300 pounds is usually the maximum pressure applied.

Both the steam pressure and duration of reaction are dependant upon the specific chloride used. In addition, the time and pressure depend upon the quantity of chloride employed as a catalyst. In general the relationship between steam pressure, time of reaction, and the amount of the different chlorides required as catalysts to produce products of approximately equivalent moisture resistance is illustrated in the following table of examples using saturated steam. The examples are arranged according to the decreasing activity of the catalyst. In each of the following examples, the specified chloride in the amount required was mixed thoroughly with ordinary sawdust. The mixture was introduced into the reacting autoclave and steam was supplied to the interior of the autoclave at the pressure stated and for the time stated. At the end of the reaction time, the mass was removed, broken up and was found to be a powder having resinous characteristics that could be shaped, such as by molding or extruding, to a desired form.

TABLE I

| Example | Chloride | Amount Required, Percent | Steam Pressure, p.s.i. | Time of Reaction, Min. |
|---|---|---|---|---|
| 1 | Titanium | 0.25 | 100 | 20 |
| 2 | Aluminum | 0.25 | 300 | 20 |
| 3 | do | 0.50 | 200 | 20 |
| 4 | Cupric | 1.00 | 200 | 20 |
| 5 | Iron (Ferric) | 2.00 | 200 | 20 |
| 6 | do | 1.00 | 300 | 20 |
| 7 | Acetyl | 1.00 | 200 | 20 |
| 8 | Ammonium | 1.00 | 300 | 20 |
| 9 | Iron (Ferrous) | 2.00 | 300 | 20 |
| 10 | Zinc | 3.00 | 200 | 20 |
| 11 | do | 2.00 | 300 | 20 |
| 12 | Manganese | 2.00 | 300 | 20 |
| 13 | Magnesium | 2.50 | 300 | 20 |
| 14 | Calcium | 3.00 | 300 | 20 |
| 15 | Potassium | 6.00 | 300 | 20 |

In the practice of this invention, the catalysts are dissolved in either water or an organic solvent, and then added to the lignocellulose. The solvent functions to disperse the catalyst throughout the mass of the lignocellulose. The amount of the solvent used, which is preferably water, is generally between 5–30% of the weight of the lignocellulose.

The quantity of catalyst employed is dependent upon its activity, as listed in Table I. In general the catalyst is used in an amount between 0.1–50% by weight of the lignocellulose depending upon the type of reaction. With one of the most active chlorides, aluminum, as little as 0.1% is effective in some reactions; while with the less active, much larger quantities are required. In the preferred process the catalyst is present in an amount equal to between 0.1%–20.0% of the weight of the lignocellulose. In addition to the activity, specific reactions may require more or less of a given catalyst.

The chlorides employed as catalysts may be titanium, aluminum, cupric, iron (ferric), acetyl, ammonium, iron (ferrous), zinc, manganese, magnesium, calcium, and potassium. In the preferred process the catalysts employed are aluminum, iron, acetyl, ammonium, zinc, calcium, and magnesium. In general, aluminum and iron chlorides are of a higher order of activity than are acetyl, ammonium and zinc, which are less active. Calcium and magnesium are the least active, and similarly are of the same degree of activity.

In the practice of this invention it has been found that very moisture resistant materials can be produced by reacting lignocellulose with steam in the presence of a chloride. In addition, the chlorides promote reactions between lignocellulose and high molecular weight aromatic materials such as Vinsol, phenolic residue and lignin; they catalyze both esterification reactions with fatty acids such as Tall oil, and lignocellulose condensation with phenols, and they promote diverse reactions such as between sulfur and lignocellulose, and dicyclopentadiene and lignocellulose. Thus a wide variety of material can be produced depending upon the choice of reactants.

The preferred reactants used in conjunction with steam to produce low cost materials having an optimum of strength and moisture resistance are Vinsol, phenolic residue or lignin. Where these materials are the reactants, they are preferably finely divided to a particle size that is preferably no more than 100 mesh on a standard screen. In the preferred process each of these reactants, Vinsol, phenolic residue or lignin is used in an amount between 2.0–30.0% by weight of the lignocellulose. Such additives are preferably thoroughly blended with the lignocellulose in a mixing device such as a ball-mill, and then the liquid catalyst is added to the mixture, which is then further agitated to uniformly disperse the catalyst throughout the blend. The specific reaction time and the reaction temperature will depend upon the chloride chosen as the catalyst, but in general it is about the same as that given above in connection with steam alone as the reactant.

The preparation and characteristics of Vinsol are set out in my copending application Serial No. 608,196, filed September 6, 1956, now patent No. 2,872,330, issued February 3, 1959.

Where lignocellulose is condensed in the presence of steam with a phenol such as cresol or phenol, it is preferably used in an amount between 1–20% by weight of lignocellulose. Liquid phenol or cresol is first added to the comminuted lignocellulose, and they are thoroughly blended together in a ball-mill or other mixer prior to the addition of the catalyst. Similarly to the other reactants, the reaction time and temperature depend upon the specific chloride used as a catalyst.

Where acids, such as Tall oil are used to esterify the lignocellulose in the presence of steam with a chloride as a catalyst, they are preferably used in an amount between 0.5–50% by weight of the lignocellulose. These reactants likewise are preferably blended with the lignocellulose before the addition of the chloride. When very small quantities are employed, however, they can be emulsified in the catalyst solution, and added at the same time. Again, as with the other reactants, the temperature, and duration of reaction, are dependent upon the specific catalyst.

Where sulfur is the reactant in conjunction with steam, the sulfur is preferably finely divided to a particle size that is preferably no more than 100 mesh on the standard screen. An especially preferred range of particle size is between 200–300 mesh. In the preferred process the sulfur is used in an amount between 0.5–20% by weight of the lignocellulose. The reaction time and the reaction temperature is about the same as that given in connection with steam alone, but again will depend upon the specific chloride used as the catalyst.

When unsaturated organic compounds such as dicyclopentadiene are reacted with lignocellulose, they are preferably blended before the addition of the catalyst. The preferred amount of dicyclopentadiene is between 0.5–30% by weight of lignocellulose. The reaction time and temperature again depends on the chloride catalyst, but is in general approximately the same as that given for steam.

When alcohols such as isopropyl alcohol or glycerine are used, the preferred amount is about 2–30%.

The materials produced by this invention can be used to produce a variety of products. The materials can be formed into boards in a press, and molded or extruded into any desired shape. They possess far superior water resistance compared to conventional lignocellulose materials, and they are formable at a low temperature such as in the approximate range of 275 to 325° F. without the use of excessive pressures. The temperature at which the materials are formed is not critical, however, since boards can easily be made at 400° F. or higher if desired. The ability to form products at lower temperature is an important property since many of the synthetic thermoplastic resins formable at this temperature can thus be blended with the modified lignocellulose, if it is desired to further change the physical properties of the product.

Products can be produced over a wide range of density from approximately 0.5–1.5 depending upon the temperature and pressure used. The pressures utilized can vary from 25–5000 p.s.i. depending upon the molding temperature, and the final product density desired. In general, the lower pressures are used at the higher temperatures. Where boards or preforms (a lightly compressed self-sustaining mass) are produced the pressure is generally between 25–800 p.s.i. and temperature between 300–400° F. If the materials are molded or extruded the higher pressures are used, and the temperature ordinarily required is between 275–350° F.

When boards or preforms are made the particle size is preferably between ¼ inch—100 mesh as measured on a standard screen, but it will depend upon the final board density, and associated properties desired. The preferred particle size is between 20–50 mesh. The press time is only sufficient to cause the particles to coalesce and bond to each other and to reach the desired board density. The time will, of course, vary with the applied pressure, press temperature, and with the material used as well as the thickness of the finished board. In general, the press time is between 0.2–20 minutes. A ¼ inch thick board can ordinarily be made in 6–8 minutes, at a temperature of 350° F. and under 100 p.s.i. pressure.

Where the reaction products of this invention are molded or extruded, the product is preferably removed from the reaction vessel, and then ground to a powder that is preferably not over 50 mesh in size. The finely divided moldable material is heated to a temperature just sufficient to flow and fill the mold, or to extrude through a die under the pressure used. The molding time is only sufficient to cause the moldable material to fill the mold, and set, and will vary depending upon the type of mold being used, the temperature, the nature of the moldable material, and similar factors. In general, the molding time will vary between 0.2–15 minutes.

If desired, fillers or fibrous materials can be blended with the reaction products to achieve desired physical properties. Among the fillers that have been used are wood flour, mica, diatomaceous earth, pearlite, and silica. They are preferably used in quantities up to 25% of the weight of the lignocellulose reaction products. The exact amount of each filler used is, of course, dependant upon its bulk density, the physical properties required of the product, and the ability of the specific reaction product to wet and bond the filler. The fillers are preferably finely divided and in general not coarser than 20 mesh as measured on a standard screen. Where non-porous mineral fillers are used, they are preferably not coarser than 100 mesh.

When fibrous materials are blended with the reaction products, they are preferably used in quantities up to 25% of the weight of the reaction product. The quantity employed will again depend upon the nature of the fiber, the specific reaction product, and the physical properties required in the formed products. Among the fibers which have been employed are asbestos, hammer-milled sawdust, glass, Silvacon (finely divided tree bark), cotton, bagasse, and pulped wood.

In general, mineral fibers and fillers produce high density products with very low moisture absorption. However, materials such as pearlite can be used where a lower density is desirable. The organic additives increase the moisture absorption, but within the limits given above, do not seriously affect the dimensional stability. Organic fillers can be used to reduce the density of the products.

*Example 16*

To 500 grams of 20 mesh, hammermilled Ponderosa pine, containing only its normal moisture content of approximately 6%, was added 100 grams of a 2½ percent aqueous solution of aluminum chloride. Based on the weight of the lignocellulose the amount of solution was approximately 20% and the aluminum chloride was approximately ½%. The mixture was ball-milled for ½ hour to obtain a uniform dispersion of the aluminum chloride throughout the mass. This composition was then placed in a heated autoclave and saturated steam was admitted until the pressure was 300 pounds per square inch gauge, and the temperature was approximately 425° F. The autoclave was held under these conditions for 20 minutes and then the steam was rapidly flashed off. During the course of the run, the pressure was maintained at 300 p.s.i. by venting off the excess pressure caused by volatile reaction by-products. The granular reaction product, which had been cooled below the incipient reaction point by the rapid steam flash-off, was removed from the autoclave and all particles which had consolidated were thoroughly broken up. The moisture or volatile content of this material was approximately 10%.

In the same manner as specified in Example 16, reaction products of lignocellulose and steam in the presence of catalytic amounts of each of the chlorides of titanium, manganese, copper, iron, ammonium, zinc, calcium, magnesium, potassium and acetyl were prepared. The following table sets forth the quantity of chloride used, based on the weight of the lignocellulose, the reaction time, and the autoclave conditions maintained during the reaction.

TABLE II

| Example | Chloride | Percent Chloride Used, Percent | Reaction Time, Min. | Autoclave Temperature, °F. | Autoclave Pressure, p.s.i. |
|---|---|---|---|---|---|
| 17 | Titanium | 0.25 | 15 | 350 | 100 |
| 18 | Manganese | 2.00 | 20 | 440 | 300 |
| 19 | Copper | 1.00 | 20 | 440 | 300 |
| 20 | Iron | 1.00 | 15 | 400 | 300 |
| 21 | do | 2.00 | 15 | 400 | 200 |
| 22 | Ammonium | 1.00 | 20 | 440 | 300 |
| 23 | Zinc | 1.00 | 15 | 440 | 300 |
| 24 | do | 2.00 | 20 | 440 | 300 |
| 25 | Calcium | 1.00 | 20 | 440 | 300 |
| 26 | do | 2.00 | 20 | 440 | 300 |
| 27 | Magnesium | 2.00 | 20 | 440 | 300 |
| 28 | Potassium | 2.00 | 25 | 440 | 300 |
| 29 | Acetyl | 1.00 | 20 | 440 | 300 |

The above percentages are by weight of the lignocellulose and the pressures are gauge pressures.

To determine the effect of the chlorides on the lignocellulose-steam reactions, several controls were run similarly to Examples 16–29, in which plain lignocellulose was reacted with steam. The reaction times and autoclave conditions are given in Table III.

TABLE III

| Control | Chloride | Reaction Time, Min. | Autoclave Temperature, °F. | Autoclave Pressure, p.s.i. |
|---|---|---|---|---|
| A | None | 20 | 440 | 300 |
| B | None | 30 | 440 | 300 |

The reaction products from Examples 16–29 and controls A and B were then evaluated by pressing them into boards, and testing the boards to determine their moisture, resistance and strength. The boards were formed by placing 80 grams of the reaction product into a 4 x 5 inch steel frame ¾ inch high, and leveling the material. A 4 x 5 inch steel plug, heated to the press temperature, was then placed on top of the material and this assembly was put into a hot press. Table IV sets forth the specific press temperature, pressure and time cycles that were used for the various reaction products. In general, the above procedure produced boards of approximately ¼–⅜ inch thickness, depending upon the reaction product. The density of the boards was determined and they were tested in both a one hour boil and a 48 hour immersion in room temperature water to obtain their moisture absorption and their dimensional stability. In addition, the boards were tested in flexure to determine their modulus of rupture. The results of these tests are also included in Table IV.

TABLE IV

| Product Example | Percent Chloride | Press Conditions | | | Density, lb./ft.³ | M.R., p.s.i. | Increase From Boil Test | | Increase From 48-Hour Immersion | |
|---|---|---|---|---|---|---|---|---|---|---|
| | | Time, Min. | Temp., °F. | Press. p.s.i. | | | Wt., percent | Thick., percent | Wt., percent | Thick., percent |
| Control A | None | 10 | 300 | 100 | 51.0 | 472 | Delaminated | | 58.5 | 10.2 |
| Do | do | 10 | 400 | 40 | 42.5 | 393 | 74.8 | 16.5 | 75.5 | 5.2 |
| Control B | do | 10 | 300 | 100 | 39.6 | 70 | Delaminated | | 88.6 | 8.3 |
| Do | do | 10 | 400 | 40 | 39.0 | 247 | 92.3 | 19.7 | 84.8 | 4.9 |
| 16 | ½% Aluminum | 10 | 300 | 100 | 62.6 | 1,414 | 17.8 | 7.17 | 17.8 | 2.1 |
| 16 | do | 10 | 400 | 40 | 58.0 | 1,309 | 25.7 | 3.4 | 37.8 | 1.7 |
| 17 | ¼% Titanium | 10 | 400 | 40 | 36.4 | 95 | 95.9 | 8.7 | 102.4 | 6.9 |
| 18 | 2% Manganese | 10 | 400 | 40 | 47.0 | 287 | 53.3 | 6.5 | 51.5 | 2.2 |
| 19 | 1% Copper | 10 | 400 | 40 | 55.5 | 562 | 37.5 | 3.5 | 39.5 | 2.9 |
| 20 | 1% Iron | 10 | 300 | 100 | 62.8 | 1,020 | 26.1 | 9.8 | 18.2 | 2.5 |
| 20 | do | 10 | 400 | 40 | 57.6 | 1,445 | 27.4 | 5.0 | 30.7 | 3.8 |
| 21 | 2% Iron | 10 | 400 | 40 | 63.7 | 1,134 | 13.6 | 1.7 | 18.5 | 1.3 |
| 22 | 1% Ammonium | 10 | 400 | 40 | 46.4 | 313 | 35.1 | 1.9 | 44.7 | 0.3 |
| 23 | 1% Zinc | 10 | 400 | 40 | 40.5 | 514 | 83.5 | 6.3 | 84.2 | 3.7 |
| 24 | 2% Zinc | 10 | 400 | 40 | 38.6 | 304 | 81.7 | 5.0 | 87.9 | 3.5 |
| 25 | 1% Calcium | 10 | 400 | 40 | 45.1 | 627 | 64.7 | 6.1 | 67.2 | 3.7 |
| 26 | 2% Calcium | 10 | 400 | 40 | 53.2 | 575 | 42.2 | 4.7 | 43.9 | 2.3 |
| 27 | 2% Magnesium | 10 | 300 | 100 | 63.5 | 1,959 | 26.1 | 13.3 | 19.6 | 3.3 |
| 27 | do | 10 | 400 | 40 | 51.3 | 800 | 41.1 | 6.4 | 43.9 | 2.7 |
| 28 | 2% Potassium | 10 | 400 | 40 | 48.2 | 773 | 57.6 | 13.7 | 54.5 | 4.8 |
| 29 | ½% Acetyl | 10 | 400 | 40 | 52.2 | 1,050 | 48.8 | 9.2 | 42.7 | 4.9 |

An examination of the properties in Table IV shows that both control boards A and B were relatively very weak products, had high water absorption, and had very poor dimensional stability as indicated by the increase in thickness in both the boil and 48-hour immersion tests. The boards made from the chloride catalyzed reaction products of Examples 16–29 had improved strength, as shown by the modulus of rupture, lower water absorption, and marked superiority in dimensional stability in both boil and immersion tests.

Improvements in dimensional stability, strength, and compressibility can also be obtained by condensing high molecular weight aromatic materials with the lignocellulose in the presence of a chloride catalyst. Examples 30–45 in Table V illustrate the reaction conditions employed with examples using lignin, Vinsol, and phenolic residue in conjunction with the chlorides as catalysts. In these examples a dry blend of the finely divided reactant, and the lignocellulose was made by ball-milling the two ingredients for ½ hour. The aqueous solution of catalyst was then added to the blend in the same manner as specified in Example 16 and the mixture was ball-milled for an additional ½ hour in order to thoroughly disperse the catalyst throughout the mass. Both the amounts of the additive and the chlorides are by weight of the lignocellulose.

To determine the effect of the chlorides, controls were run in which Vinsol, lignin and phenolic residue were blended with the lignocellulose in the same manner as specified in Examples 30–45, and the mixtures were then autoclaved without the addition of a chloride. Table VI sets forth the composition and conditions under which the controls were run.

TABLE VI

| Control Example | Additive | Reaction Time, Min. | Autoclave | |
|---|---|---|---|---|
| | | | Temperature, °F. | Pressure, p.s.i. |
| C | 5% Vinsol | 20 | 440 | 300 |
| D | 5% Lignin | 20 | 440 | 300 |
| E | 5% Phenolic Residue | 20 | 440 | 300 |

The autoclaved materials from Examples 30–45, and controls C, D, and E were pressed into boards in the

TABLE V

| Example | Chloride | Additive | Reaction Time, Min. | Autoclave | |
|---|---|---|---|---|---|
| | | | | Temperature, °F. | Pressure, p.s.i. |
| 30 | 1% Ferric | 5% Vinsol | 20 | 440 | 300 |
| 31 | do | 5% Lignin | 20 | 440 | 300 |
| 32 | do | 5% Phenolic Residue | 20 | 440 | 300 |
| 33 | 2% Zinc | 5% Vinsol | 15 | 440 | 300 |
| 34 | do | 5% Lignin | 15 | 440 | 300 |
| 35 | do | 5% Phenolic Residue | 15 | 440 | 300 |
| 36 | 2% Magnesium | 5% Vinsol | 20 | 440 | 300 |
| 37 | do | 5% Lignin | 15 | 440 | 300 |
| 38 | do | 5% Phenolic Residue | 15 | 440 | 300 |
| 39 | 2% Calcium | 5% Vinsol | 25 | 440 | 300 |
| 40 | do | 5% Lignin | 20 | 440 | 300 |
| 41 | do | 5% Phenolic Residue | 15 | 440 | 300 |
| 42 | ½% Ammonium | 5% Vinsol | 20 | 440 | 300 |
| 43 | do | 5% Lignin | 20 | 440 | 300 |
| 44 | do | 5% Phenolic Residue | 20 | 440 | 300 |
| 45 | 2% Manganese | 5% Vinsol | 20 | 440 | 300 | manner specified for Examples 16–29, and the boards were evaluated by testing for moisture absorption, dimensional stability and strength in flexure. The results of these tests, together with the press conditions used, are set forth in Table VII below.

TABLE VII

| Prod. Exam. | Percent Chloride | Additive | Press Conditions ||| Density, lb./ft.³ | M.R., p.s.i. | Increase From Boil Test || Increase From 48-Hour Immersion ||
|---|---|---|---|---|---|---|---|---|---|---|---|
| | | | Time, Min. | Temp., °F. | Press, p.s.i. | | | Wt., Percent | Thick., Percent | Wt., Percent | Thick., Percent |
| C | None | 5% Vinsol | 10 | 400 | 40 | 50.0 | 917 | 61.8 | 14.5 | 54.8 | 4.6 |
| D | do | 5% Lignin | 10 | 400 | 40 | 47.0 | 625 | 65.3 | 11.2 | 62.9 | 4.2 |
| E | do | 5% Phenolic Residue | 10 | 400 | 40 | 51.5 | 818 | 57.7 | 22.0 | 50.0 | 5.5 |
| 30 | 1% Ferric | 5% Vinsol | 10 | 400 | 40 | 62.2 | 1,197 | 18.0 | 3.2 | 23.9 | 1.1 |
| 31 | do | 5% Lignin | 10 | 400 | 40 | 50.7 | 816 | 42.9 | 2.4 | 48.0 | 1.7 |
| 32 | do | 5% Phenolic Residue | 10 | 400 | 40 | 55.3 | 1,389 | 25.8 | 4.1 | 31.4 | 2.1 |
| 33 | 2% Zinc | 5% Vinsol | 10 | 400 | 40 | 52.3 | 1,106 | 44.9 | 5.7 | 44.9 | 2.7 |
| 34 | do | 5% Lignin | 10 | 400 | 40 | 39.2 | 412 | 83.2 | 4.1 | 87.3 | 2.8 |
| 35 | do | 5% Phenolic Residue | 10 | 400 | 40 | 50.8 | 1,162 | 43.7 | 5.1 | 34.5 | 2.1 |
| 36 | 2% Magnesium | 5% Vinsol | 10 | 400 | 40 | 55.2 | 971 | 36.1 | 3.8 | 28.1 | 1.1 |
| 37 | do | 5% Lignin | 10 | 400 | 40 | 57.1 | 976 | 33.1 | 4.5 | 27.1 | 1.0 |
| 38 | do | 5% Phenolic Residue | 10 | 400 | 40 | 62.0 | 1,804 | 19.7 | 4.1 | 16.4 | 1.3 |
| 39 | 2% Calcium | 5% Vinsol | 10 | 400 | 40 | 49.8 | 946 | 46.3 | 5.1 | 50.7 | 2.6 |
| 40 | do | 5% Lignin | 10 | 400 | 40 | 54.0 | 722 | 45.4 | 4.3 | 44.3 | 1.9 |
| 41 | do | 5% Phenolic Residue | 10 | 400 | 40 | 61.5 | 1,819 | 28.1 | 6.4 | 27.9 | 2.7 |
| 42 | ½% Ammonium | 5% Vinsol | 10 | 400 | 40 | 55.3 | 875 | 39.2 | 7.1 | 37.1 | 2.8 |
| 43 | do | 5% Lignin | 10 | 400 | 40 | 55.5 | 1,488 | 34.6 | 7.1 | 36.4 | 3.7 |
| 44 | do | 5% Phenolic Residue | 10 | 400 | 40 | 56.0 | 1,298 | 29.9 | 7.6 | 39.3 | 3.3 |
| 45 | 2% Manganese | 5% Vinsol | 10 | 400 | 40 | 49.3 | 797 | 44.5 | 2.3 | 49.7 | 1.2 |

From a comparison of the physical properties of the boards listed in Table VII it is apparent that the strength of the boards is improved, and both the moisture absorption and dimensional stability are improved when a chloride is used as a catalyst in the condensation of these high molecular weight materials with lignocellulose. Depending upon the chloride and additive used, reaction products are produced possessing a wide range of properties.

When phenols are condensed with lignocellulose, in the presence of steam utilizing a chloride catalyst, the plasticity of the reaction product is improved. Thus where materials are desired for high pressure molding or extrusion, phenols may be included in the reaction to obtain a higher degree of flow in the molding or extrusion operation. Table VIII sets forth examples of reactions utilizing phenol and cresol. The quantities of chloride and additives shown are by weight of the lignocellulose.

corresponding compositions, autoclave conditions and reaction times, but without the addition of a phenol, are set forth in Table IX.

TABLE IX

| Product, Example | Chloride | Additive | Phenol | Flow Time |
|---|---|---|---|---|
| Control F | 2% Calcium | None | None | 1¾ Min. |
| 46 | 3% Calcium | do | 5% Cresol | 20 Sec. |
| Control G | do | 5% Vinsol | None | 2¼ Min. |
| 47 | do | do | 3% Cresol | 15 Sec. |
| Control H | 1% Ferric | None | None | 11 Min. |
| 48 | do | do | 5% Phenol | 8½ Min. |

In all examples of Table IX the press temperature was 300° F. and the press pressure was 5000 p.s.i.

The observed flow times listed in Table IX indicate that the condensation of phenols with lignocellulose in the presence of a chloride improves the plasticity of the

TABLE VIII

| Example No. | Chloride | Additive | Phenol | Reaction Time, Min. | Autoclave ||
|---|---|---|---|---|---|---|
| | | | | | Temp., °F. | Pressure, p.s.i. |
| 46 | 3% Calcium | None | 5% Cresol | 20 | 440 | 300 |
| 47 | do | 5% Vinsol | 3% Cresol | 20 | 440 | 300 |
| 48 | 1% Ferric | None | 5% Phenol | 15 | 440 | 300 |

In order to obtain a relative measure of flow, and to evaluate the effect of the phenols on plasticity, ten gram quantities of the reaction products were placed in a 2-inch diameter cylinder, and a piston was placed on top of the material. Both the cylinder and the piston were heated to 300° F. This assembly was then placed in a press maintained at 300° F. and the press was closed until the pressure on the material was 5000 p.s.i. The time required for the material to extrude out from underneath the bottom of the cylinder on the platen was then observed, and used as a measure of the relative plasticity. The results of this test for Examples 46–48, as well as for controls F, G, and H, which are autoclaved materials of material, even when phenols are used in only small quantities.

Where materials are required that exhibit less moisture absorption, and greater dimensional stability than the chloride catalyzed lignocellulose reaction with steam, fatty acids such as tall oil, butyric, etc. can be used and they appear to esterify some of the alcoholic functional groups in the lignocellulose. Here again the chlorides appear to function as catalysts. In general where fatty acids are employed, somewhat lower pressures or shorter reaction times may be used in processing the material. Table X sets forth the conditions under which a number of the chlorides have been used in conjunction with fatty acids.

TABLE X

| Example | Chloride | Additive | Reaction Time, Minutes | Autoclave Temp., °F. | Autoclave Pressure, p.s.i. |
|---|---|---|---|---|---|
| 49 | 1% Aluminum | 10% Tall Oil | 5 | 400 | 200 |
| 50 | do | 10% Butyric Acid | 5 | 400 | 200 |
| 51 | 1% Ferric | 5% Tall Oil | 20 | 400 | 200 |
| 52 | do | 2½% Tall Oil + 2½% Butyric Anhydride | 15 | 440 | 300 |
| 53 | 1% Zinc | 5% Tall Oil | 15 | 440 | 300 |
| 54 | 3% Calcium | 5% Vinsol + 3% Tall Oil | 20 | 440 | 300 |
| 55 | 1% Acetyl | 10% Tall Oil | 10 | 375 | 150 |

The autoclaved materials in Examples 49–55 were pressed into boards and evaluated in the same manner as specified for Examples 16–29. The physical properties obtained and the press conditions employed are listed in Table XI.

TABLE XI

| Prod. Exam. | Percent Chloride | Additive | Press Conditions Time, Min. | Press Conditions Temp., °F. | Press Conditions Press., p.s.i. | Density, lb./ft.³ | M.R., p.s.i. | Boil Test Wt., Percent | Boil Test Thick., Percent | 48-Hour Immersion Wt., Percent | 48-Hour Immersion Thick., Percent |
|---|---|---|---|---|---|---|---|---|---|---|---|
| 49 | 1% Aluminum | 10% Tall Oil | 10 | 400 | 40 | 65.0 | 1,483 | 10.4 | 0.8 | 16.6 | 0.8 |
| 50 | do | 10% Butyric Acid | 10 | 400 | 40 | 63.5 | 1,570 | 22.1 | 2.9 | 21.6 | 2.2 |
| 51 | 1% Ferric | 5% Tall Oil | 10 | 400 | 40 | 56.0 | 1,292 | 35.9 | 5.1 | 36.3 | 3.6 |
| 52 | do | 2½% Tall Oil + 2½% Butyric Anhydride | 10 | 400 | 40 | 59.0 | 1,360 | 24.2 | 3.4 | 24.1 | 1.9 |
| 53 | 1% Zinc | 5% Tall Oil | 10 | 400 | 40 | 50.5 | 908 | 43.2 | 3.1 | 34.1 | 1.9 |
| 54 | 3% Calcium | 5% Vinsol + 3% Tall Oil | 10 | 400 | 40 | 60.7 | 1,099 | 10.3 | 2.1 | 12.6 | 1.7 |
| 55 | 1% Acetyl | 10% Tall Oil | 10 | 400 | 40 | 65.0 | 1,717 | 17.1 | 3.8 | 18.9 | 3.2 |

A comparison of the physical properties of the boards produced in Examples 49–55 with those listed in Tables IV and VII for similar compositions, but without a fatty acid indicate that the dimensional stability is improved even though generally milder reaction conditions were used in processing the materials. The boards themselves appear to be somewhat softer, and more resilient when long chain fatty acids are used in the esterification of the lignocellulose.

The chlorides also appear to promote a wide variety of other reactions with lignocellulose, such as reaction with unsaturated compounds, alcohols, and elemental sulfur. The properties of such reaction products vary widely, depending upon the specific reactant used. Table XII sets forth a number of representative reactions along with the conditions under which the materials were autoclaved.

TABLE XII

| Exam. No. | Chloride | Additive | Reaction Time, Min. | Autoclave Temp., °F. | Autoclave Pressure p.s.i. |
|---|---|---|---|---|---|
| 56 | 1% Aluminum | 10% Dicyclopentadiene | 10 | 400 | 200 |
| 57 | ½% Aluminum | 10% Styrene Monomer | 15 | 440 | 300 |
| 58 | do | 10% Isopropyl Alcohol | 20 | 440 | 300 |
| 59 | do | 10% Glycerine | 20 | 400 | 200 |
| 60 | 1% Ferric | 6% Sulfur | 12 | 440 | 300 |
| 61 | 1% Zinc | do | 12 | 440 | 300 |

Similarly to the previous examples, the materials from Examples 56–61 were pressed into boards as specified for Examples 16–29, and the boards were evaluated. The physical properties obtained along with the press conditions employed are listed in Table XIII.

TABLE XIII

| Prod. Exam. | Chloride | Additive | Press Conditions Time, Min. | Press Conditions Temp., °F. | Press Conditions Press, p.s.i. | Density, lb./ft.³ | M.R., p.s.i. | Increase From Boil Test Wt., Percent | Increase From Boil Test Thick., Percent | Increase From 48-Hour Immersion Wt., Percent | Increase From 48-Hour Immersion Thick., Percent |
|---|---|---|---|---|---|---|---|---|---|---|---|
| 56 | 1% Aluminum | 10% Dicyclopentadiene | 10 | 300 | 100 | 69.6 | 2,030 | 12.2 | 5.2 | 13.0 | 2.7 |
| 57 | ½% Aluminum | 10% Styrene Monomer | 10 | 400 | 40 | 67.5 | 1,096 | 13.4 | 2.1 | 10.5 | 1.7 |
| 58 | do | 10% Isopropyl Alcohol | 10 | 400 | 40 | 43.7 | 349 | 54.9 | 2.6 | 60.5 | 1.8 |
| 59 | do | 10% Glycerine | 10 | 400 | 40 | 71.0 | 1,319 | 8.5 | 6.3 | 9.6 | 2.4 |
| 60 | 1% Ferric | 6% Sulfur | 10 | 400 | 40 | 41.1 | 667 | 78.7 | 3.9 | 63.3 | 2.6 |
| 61 | 1% Zinc | do | 10 | 400 | 40 | 56.0 | 508 | 38.0 | 3.1 | 38.2 | 2.5 |

From the densities of the boards listed in Table XIII it is apparent that although the dimensional stabilities are fairly equivalent, the plasticity of the materials varies considerably. Thus where a higher degree of plasticity is required to produce a finished product, those reactions producing the denser or more plastic materials can be used; while the less plastic can be used for lighter weight products that have high relative dimensional stability.

If desired the reaction products that are disclosed in this invention can be blended with various fibers and fillers as well as with thermoplastic resins. In general where organic fillers are used the moisture absorption will increase, however, within the range of filler addition specified. The dimensional stability is not appreciably changed. Where thermoplastics such as vinyl chloride resins are blended with these materials, the strength is increased, and both the moisture absorption and dimensional stability appear to be improved. Table XIV lists a number of representative compositions which have been blended with fillers and thermoplastics by ball-milling the two materials together for 15 minutes prior to pressing the blends into boards. The amount of filler employed is based on the weight of the autoclave reaction products.

TABLE XIV

| Exam. No. | Autoclave Material | | Autoclave Conditions | | | Filler, Fiber or Thermoplast |
|---|---|---|---|---|---|---|
| | Chloride | Additive | Time, Min. | Temp., °F. | Press., p.s.i. | |
| 62 | 3% Calcium | 5% Vinsol | 20 | 440 | 300 | 25%—50 Mesh Wood Flour. |
| 63 | do | do | 20 | 440 | 300 | 10%—50 Mesh Wood Flour. |
| 64 | do | do | 20 | 400 | 300 | 15%—20 Mesh Hydrolyzed Wood Flour. |
| 65 | do | do | 20 | 440 | 300 | 10%—200 Mesh Bagasse. |
| 66 | do | 15% Vinsol | 20 | 440 | 300 | 25% Asbestos. |
| 67 | do | do | 20 | 440 | 300 | 25% Pearlite. |
| 68 | 2% Ferric | None | 15 | 400 | 200 | 3% Vinyl Chloride. |
| 69 | 2% Zinc | do | 15 | 440 | 300 | 5% Vinyl Chloride. |
| 70 | 2% Calcium | do | 20 | 440 | 300 | Do. |

Table XV lists the properties obtained and press conditions used for the boards of Examples 62–70.

TABLE XV

| Prod. Exam. | Filler or Thermoplast | Press Conditions | | | Density, lbs./ft.³ | M.R., p.s.i. | Increase From Boil Test | | Increase From 48-Hour Immersion | |
|---|---|---|---|---|---|---|---|---|---|---|
| | | Time, Min. | Temp., °F. | Press., p.s.i. | | | Wt., Percent | Thick., Percent | Wt., Percent | Thick., Percent |
| 62 | 25% Wood Flour | 10 | 400 | 40 | 53.5 | 882 | 40.6 | 4.4 | 33.4 | 2.7 |
| 63 | 10% Wood Flour | 10 | 400 | 40 | 58.8 | 1,712 | 27.9 | 3.7 | 28.2 | 2.4 |
| 64 | 15% Hydrolyzed Wood | 10 | 400 | 40 | 53.0 | 668 | 36.4 | 5.3 | 32.1 | 0.6 |
| 65 | 10% Bagasse | 10 | 400 | 40 | 56.0 | 1,125 | 29.8 | 4.8 | 32.7 | 2.7 |
| 66 | 25% Asbestos | 10 | 400 | 40 | 73.5 | 2,026 | 16.6 | 1.9 | 14.7 | 1.2 |
| 67 | 25% Pearlite | 10 | 400 | 40 | 48.2 | 622 | 30.3 | 3.1 | 31.4 | 0.7 |
| 68 | 3% Vinyl Chloride | 10 | 400 | 40 | 61.8 | 2,744 | 11.5 | 2.7 | 16.3 | 1.3 |
| 69 | 5% Vinyl Chloride | 10 | 400 | 40 | 45.0 | 916 | 58.6 | 2.8 | 63.7 | 1.7 |
| 70 | do | 10 | 400 | 40 | 56.5 | 1,378 | 28.4 | 2.6 | 28.1 | 1.2 |

It should be noted from Table XV that the density of the boards varies with the type of filler. Where asbestos is used the board reaches a density of 73.5 in comparison with 53.5 for wood flour. The density, of course, will be a factor in the production of many products. It should also be observed that even where as much as 25% of wood flour is incorporated into the board, the dimensional stability still remains very good.

All percentages herein are by weight of the lignocellulose and all pressures are gauge. The immersion tests herein were all made in water at room temperature.

The phenolic residue used herein is essentially a condensation product of phenol with acetone and alpha-methylstyrene.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure; and heating said mixture in a confined atmosphere in the presence of moisture at a pressure of about 25–700 pounds per square inch gauge and a temperature of about 250–500° F. for about 4–60 minutes, said percentage being by weight of the lignocellulose.

2. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, said chloride being a member of the class consisting of titanium, aluminum, copper, iron, ammonium, zinc, manganese, magnesium, calcium, potassium and acetyl chlorides; and heating said mixture in a confined atmosphere in the presence of moisture at a pressure of about 25–700 pounds per square inch gauge and a temperature of about 250–500° F. for about 4–60 minutes, said percentage being by weight of the lignocellulose.

3. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, and about 2–30% of lignin; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

4. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, and about 2–30% of a solvent extracted pine wood resin substantially free of wood rosin; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

5. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, and about 1–20% of a phenol; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

6. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, and about 0.5–50% of a fatty acid; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

7. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, and about 0.5–20% sulfur; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

8. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure; and about 0.5–30% of an unsaturated organic compound; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

9. The method of making a moldable lignocellulose product, consisting essentially of: intimately mixing finely divided lignocellulose material with about 0.1–50% of a chloride catalyst capable of catalyzing the conversion of at least a portion of the lignocellulose to a material capable of being consolidated under heat and pressure, and about 2–30% of an alcohol; and heating said mixture in a confined atmosphere in the presence of moisture at a pressure of about 25–700 pounds per square inch gauge and a temperature of about 250–500° F. for about 4–60 minutes, said percentages being by weight of the lignocellulose.

10. A lignocellulose product prepared by the method of claim 1.

11. A lignocellulose product prepared by the method of claim 3.

12. A lignocellulose product prepared by the method of claim 4.

13. A lignocellulose product prepared by the method of claim 5.

14. A lignocellulose product prepared by the method of claim 6.

15. A lignocellulose product prepared by the method of claim 7.

16. A lignocellulose product prepared by the method of claim 8.

17. A lignocellulose product prepared by the method of claim 9.

References Cited in the file of this patent

UNITED STATES PATENTS

| | | |
|---|---|---|
| 2,156,160 | Olson et al. | Apr. 25, 1939 |
| 2,379,889 | Dorland et al. | July 10, 1945 |
| 2,379,890 | Dorland et al. | July 10, 1945 |

FOREIGN PATENTS

| | | |
|---|---|---|
| 497,477 | Great Britain | Dec. 16, 1938 |